(12) United States Patent
Liew

(10) Patent No.: US 11,138,316 B2
(45) Date of Patent: Oct. 5, 2021

(54) APPARATUS AND METHOD TO PROVIDE SECURE FUSE SENSE PROTECTION AGAINST POWER ATTACKS

(71) Applicant: Intel Corporation, Santa Clara, CA (US)

(72) Inventor: Vui Yong Liew, Penang (MY)

(73) Assignee: Intel Corporation, Santa Clara, CA (US)

( * ) Notice: Subject to any disclaimer, the term of this patent is extended or adjusted under 35 U.S.C. 154(b) by 165 days.

(21) Appl. No.: 16/457,571

(22) Filed: Jun. 28, 2019

(65) Prior Publication Data

US 2019/0325141 A1 Oct. 24, 2019

(51) Int. Cl.
| | | |
|---|---|---|
| *G06F 21/00* | (2013.01) | |
| *G06F 21/57* | (2013.01) | |
| *G06F 21/81* | (2013.01) | |
| *G06F 21/75* | (2013.01) | |

(52) U.S. Cl.
CPC .......... *G06F 21/575* (2013.01); *G06F 21/755* (2017.08); *G06F 21/81* (2013.01)

(58) Field of Classification Search
CPC ....... G06F 21/575; G06F 21/81; G06F 21/755
See application file for complete search history.

(56) References Cited

U.S. PATENT DOCUMENTS

| 9,343,175 B2 * | 5/2016 | Kim | G11C 7/14 |
|---|---|---|---|
| 2009/0147420 A1 * | 6/2009 | Graf | H03K 17/0822 |
| | | | 361/56 |
| 2014/0253221 A1 * | 9/2014 | Sandri | G06F 21/79 |
| | | | 327/525 |
| 2015/0009742 A1 * | 1/2015 | Kang | G11C 17/16 |
| | | | 365/96 |
| 2015/0364210 A1 * | 12/2015 | Kim | G11C 17/18 |
| | | | 365/96 |
| 2017/0018317 A1 * | 1/2017 | Kim | G06F 7/588 |
| 2018/0189493 A1 * | 7/2018 | Schilder | H04L 9/0861 |

FOREIGN PATENT DOCUMENTS

| CN | 102027482 A | * | 4/2011 | ........... G06F 21/556 |
|---|---|---|---|---|
| CN | 108957220 A | * | 12/2018 | |
| KR | 20140081345 A | * | 7/2014 | |

OTHER PUBLICATIONS

Shamsi et al., "IP Protection and Supply Chain Security through Logic Obfuscation: A Systematic Overview", ACM Transactions on Design Automation of Electronic Systems, Sep. (Year: 2019).*

* cited by examiner

*Primary Examiner* — Morshed Mehedi
(74) *Attorney, Agent, or Firm* — Alliance IP, LLC

(57) ABSTRACT

An apparatus of a computing system, a computer-readable medium, a method and a system. The apparatus comprises an input/output interface and one or more processors connected to the input/output interface and adapted to perform a first reading of first fuse data stored in a fuse array storage circuitry to result in read first fuse data, and receive the read first fuse data from the fuse array storage circuitry through the input/output interface; after a random time-delay, perform a second reading of second fuse data stored in the fuse array storage circuitry to result in read second fuse data, and receive the read second fuse data from the fuse array storage circuitry through the input/output interface; and compare the read first fuse data with the read second fuse data, and if there is no match, halt a boot-up of the computing system.

21 Claims, 6 Drawing Sheets

APPARATUS AND METHOD TO PROVIDE SECURE FUSE SENSE PROTECTION AGAINST POWER ATTACKS

TECHNICAL FIELD

This disclosure relates in general to the field of computing platform security and, more particularly, to protection against the alteration of fuse data at power-up or boot-up.

BACKGROUND

Programmable fuses or fuse arrays are known in the art as having various uses, such as, for example, for memory redundancy control, integrated circuit die identification, analog trimming control, customer configuration bits, encryption key coding, as well as other applications. Fuse arrays contain arrays of fuse values stored in a number of corresponding fuse sense addresses in a local memory. The fuse values can represent sensitive fuse data/fuse information, such as a key that could be used to unlock a computer architecture or a computing system, such as during boot-up. Fuse arrays contain arrays of fuse data stored in a number of corresponding fuse addresses. Fuse data need to be read out or sense from fuse arrays to local memory before fuse data can be distributed or use by other internal circuitry within the computing system. A fuse controller may be used to sense the fuse data and to download the same into the local memory. After a sensing of the fuse data, the fuse controller may then send the fuse data to internal circuitry within the computing system that requested the fuse data. Hackers may attempt to find ways to bypass security checks at boot-up, in some instances attempting to tamper with the sensitive fuse data, for example by injecting one or more voltage pulses either at low pulse or at high pulse into the power rail for the fuse array and controller in order to change the fuse value being sensed. A hacker could attempt to precisely control the timing of the voltage pulses to alter the fuse values to all zeros or to al ones, and could in this manner hack into the computing system to obtain sensitive information. The prior art attempts this issue by providing a voltage droop detector circuitry coupled to the power rail to detect any droops or spikes in the voltage therein, for example during boot-up. A steady voltage level within the power rail at the operating voltage of the fuse controller and fuse array as sensed by the voltage droop circuitry could, according to the prior art, signify that no hackers are attempting to access the system, while any droops and/or spikes could signal potential hacking.

The prior art solution of using a voltage droop detector to detect tampering with fuse data is however sensitive to process variations. As transistor process nodes shrink, such variations could become more significant, making a design of a voltage droop detector to achieve robustness more challenging. In addition, the effort required in transposing a circuit design for a voltage droop detector circuitry from one process node into another process node becomes more significant as process nodes shrink. Every process migration for the voltage droop detector circuitry, which requires a relatively high degree of sensitivity to voltage variations, becomes more difficult to define, devise and implement. Improvements are therefore needed in preventing tampering with fuse data as transistor process nodes shrink.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION OF EMBODIMENTS

Figure 1:
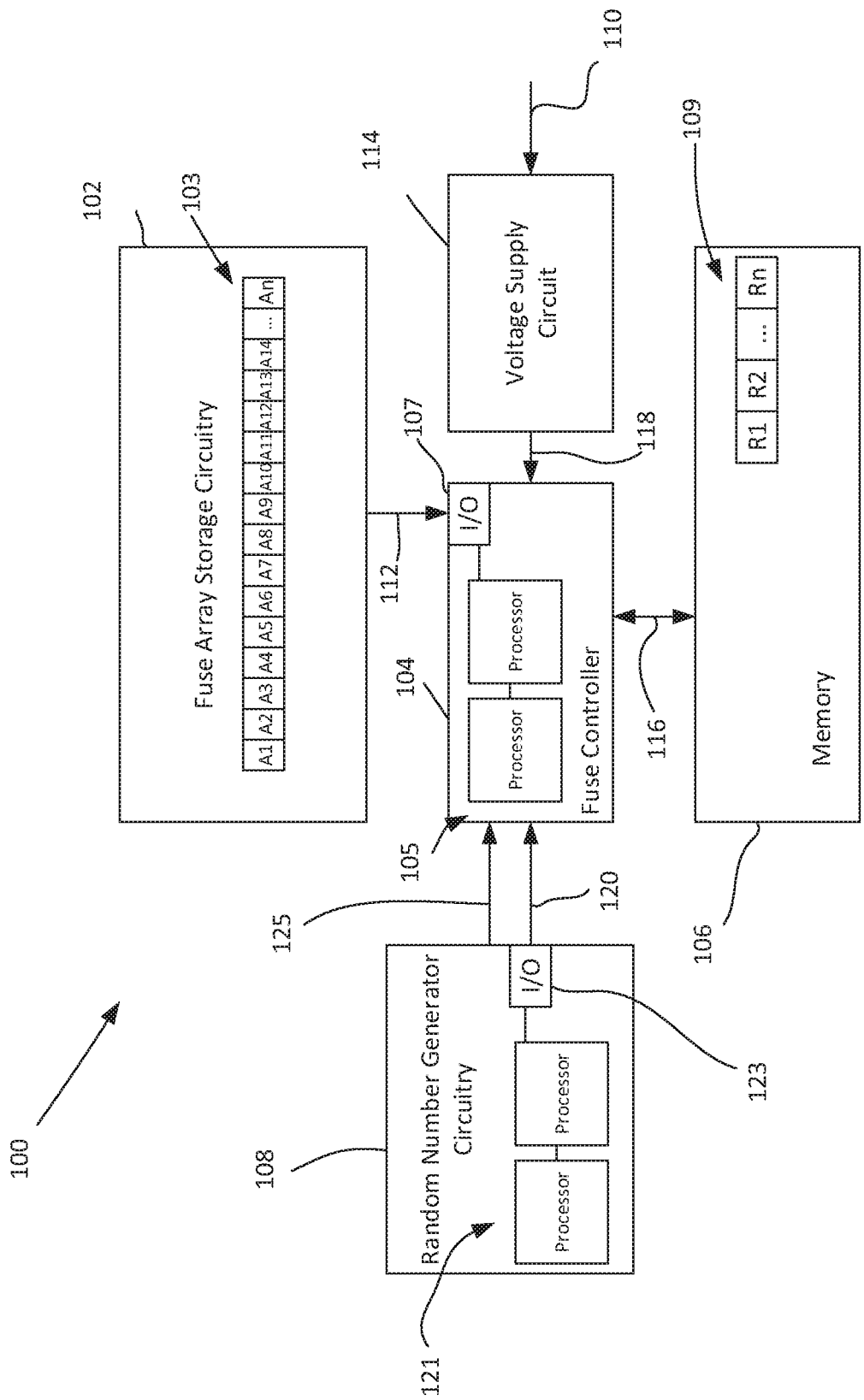
FIG. 1 is a simplified block diagram of an architecture of a fuse sense circuitry according to one embodiment.

The following disclosure provides various possible embodiments, or examples, for a secure fuse sense circuitry and method. The fuse sense circuitry may be configured with a fuse controller, a fuse array storage circuitry to store fuse arrays, a random number generator circuitry, and a memory, the fuse sense circuitry to enable a secure boot-up of a computing system including the fuse sense circuitry. The computing system may include multiple components, including one or more processing units. For example, the computing system can include, but is not necessarily limited to, single-core and/or multi-core central processing units (CPUs), system on chips (SoCs), microprocessors, chips and microchips (e.g., Platform Controller Hub (PCH)), integrated circuits (ICs), graphical processing units (GPUs), and processing systems. A fuse controller can include one or more processors configured to implement fuse sensing operations. The memory may include a random access memory (RAM), and/or a memory including registers The fuse array storage may include memory circuitry to store the fuse arrays can be part of a system memory, or can include a dedicated memory. The memory and fuse array storage may be part of the same memory circuitry, or they may be part of distinct memory circuitries.

For purposes of illustrating the several embodiments that enable secure fuse sensing during boot-up, it is important to first understand the lifecycle and configuration of a fuse sensing circuitry according to embodiments. Accordingly, the following foundational information may be viewed as a basis from which the present disclosure may be properly explained.

As used herein, 'detecting' is intended to mean sensing, scanning, measuring, discovering, identifying, and/or recognizing the particular biological characteristics or properties (or non-biological characteristics or properties) that a sensor is capable of detecting. As used herein, a "computing system" can include any electronic device, such as, by way of example and not limitation, a mobile device (e.g., smart phone, table, phablet, eBook reader, etc.), a personal computer, a laptop, a gaming system, an infotainment system in a vehicle (e.g., automobile, airplane, train, bus, subway, etc.), a wearable electronic device, an embedded device, and any other component, element, or object operable to undergo a boot-up operation involving a fuse array. In other implementations, a computing system may include network elements such as servers, appliances, routers, processors, processing systems, or any other suitable component, element, or object operable to undergo a boot-up operation involving a fuse array.

Achieving a secure boot-up operation requires the fuse data communicated from a fuse array storage to be protected from malicious or inadvertent tampering. Although currently available fuse sense circuitries offer some security mechanisms such as voltage droop detector circuitries as explained above, the functionality added by such mechanisms tends to increase cost and complexity, rendering them inadequate in many implementation scenarios.

A technique is needed in which allows secure boot-up using fuse data which is not affected by process node variations, and which can significantly decrease the probability of a successful hacking attempt.

A fuse sense circuitry 100 according to some demonstrative embodiments as shown in FIG. 1 resolves many of the aforementioned issues (and more). The simplified block diagram of FIG. 1 illustrates a fuse sense circuitry 100 that enables a secure boot-up of a computing system within which the fuse sense circuitry is integrated. Such a mechanism may be implemented as transistor process nodes shrink, and is not made more complex or costly by the same. Embodiments include a fuse sensing circuitry and a method of operating the same, where the fuse sense circuitry is configured to enable sensing the fuse data on two occasions in time, Referring still to FIG. 1, the shown fuse sense circuitry 100 of a computing system is shown to include a fuse array storage circuitry 102 to store fuse arrays, a fuse controller 104 coupled to the fuse array storage circuitry 102, a voltage supply circuitry 114 coupled to the fuse controller 104, a random number generator circuitry 108, and a memory 106, the fuse sense circuitry 100 to enable a secure boot-up of the computing system that includes all of the above parts.

The fuse controller 104 can include one or more processors 105 configured to implement fuse sensing operations. The fuse controller can further include an input/output (I/O) interface 107 coupled to the one or more processors 105, for example to receive signals from the fuse array storage circuitry 102, the random number generator circuitry 108 or the voltage supply circuitry 114, as well as from or to other circuitries within the computing system. The fuse controller 104 may control a boot-up operation of the computing system where, when a boot-up signal 110 is activated within the fuse controller 104, the fuse controller 104 may activate a read signal 112 through I/O interface 107 to perform a read operation of the fuse data in the fuse array stored in the fuse array storage circuitry 102.

The memory 106 and fuse array storage circuitry 102 may each or together include a random access memory (RAM) such as a static RAM or SRAM, and/or a memory including registers, for examples registers R1 to Rn. The fuse array storage 102 may include memory circuitry to store the fuse arrays, the memory circuitry for the fuse array storage circuitry 102 including, for example, nonvolatile memory circuitry such as an e-fuse array circuit, a NAND flash memory, a NOR flash memory, an erasable programmable read only memory (EPROM), a ferroelectric RAM (FRAM), and a magneto-resistive RAM (MRAM). The fuse array storage circuitry 102 may be configured to store a fuse array therein using respective fuse sense addresses A1 to An for corresponding portions of the fuse data of the fuse array. For example, the fuse array storage circuitry may store the fuse array therein using respective fuse sense addresses of a predetermined number of bits, for example 32, although embodiments are not so limited. The number of addresses may for example include a combination of a row address and a column address for each of the corresponding portions of the fuse data of the fuse array, as depicted by the collection of rows and columns 103 shown in FIG. 1. The number of fuse sense addresses and hence the size of the fuse array storage circuitry may be configured according to application needs. The fuse array storage circuitry may store any number of fuse sense addresses as would be recognized by one skilled in the art, such as, for example, 32 fuse sense addresses, although embodiments are not so limited. The read signal 112 may allow, by way of the fuse sense addresses, a reading or sensing of the fuse data.

The memory 106 and fuse array storage circuitry 102 may each, or together, be part of a system memory of a computing system, or they may each, or together, be part of a dedicated memory circuitry distinct from the system memory. In the embodiment of FIG. 1, for ease of illustration and description, the fuse storage circuitry 102 and the memory 106 are shown as being distinct one another, although embodiments are not so limited. It should also be noted that the fuse controller 104 and random number generator circuitry 108 may represent distinct circuitries from one another, or they may be integrated in a single processor circuitry. The memory 106 may include a number of registers 109.

The random number generator circuitry 108 may include, by way of example, a digital random number generator circuitry, although embodiments are not so limited. The random number generator circuitry may include one or more processors 121 and an I/O interface 123 coupled to the one or more processors 121 as shown.

The voltage supply circuitry 114 may be configured to generate a read voltage, for example in the form of a pulse voltage 118, to signal to the fuse controller 104 to perform a reading/sensing of the fuse data within the fuse array storage circuitry 102. The fuse controller 104, upon a sensing of the fuse data read from the fuse array storage circuitry 102, may then transmit the fuse data into the memory 106 by way of signals 116 and through the I/O interface 107, which data may be processed by the fuse controller 104 to determine whether hacking during a boot-up operation is likely to have taken place.

It is noted that a variety of semiconductor devices, such as central processing units (CPUs), graphics processing units (GPU), application processors (APs), to name a few, may use a fuse sensing circuitry including a fuse array storage circuitry such as the one shown in FIG. 1 to store fuse data required for operation thereof, such as for boot-up operation. The fuse sensing circuitry may be programmed only in the wafer state.

According to the prior art, a fuse controller would perform a reading of the fuse data within a fuse array storage circuitry, download the same into a register file within a memory. The fuse data thus downloaded would be used by the fuse controller, or by another internal circuit, in order to boot up a computing system including the fuse sensing circuitry. Disadvantageously, a hacker could inject a voltage pulse, at either low pulse or high pulse, into the power rail of the fuse sensing circuitry in order to change the fuse value being sensed. If the hacker can control a timing of the pulse, he or she could alter the fuse data to all zeros, or all ones, and thus be able to hack the system and obtain sensitive information therefrom.

However, an operation of embodiments, as will be explained by way of example with respect to FIGS. 1, 2A and 2B below advantageously introduces randomness into the read operation for the fuse data in a way that would make it extremely difficult for a hacker to time his/her voltage pulses for altering the fuse data in a way that would allow them to effectively hack into the computing system including the fuse sense circuitry 100.

Figure 2A:
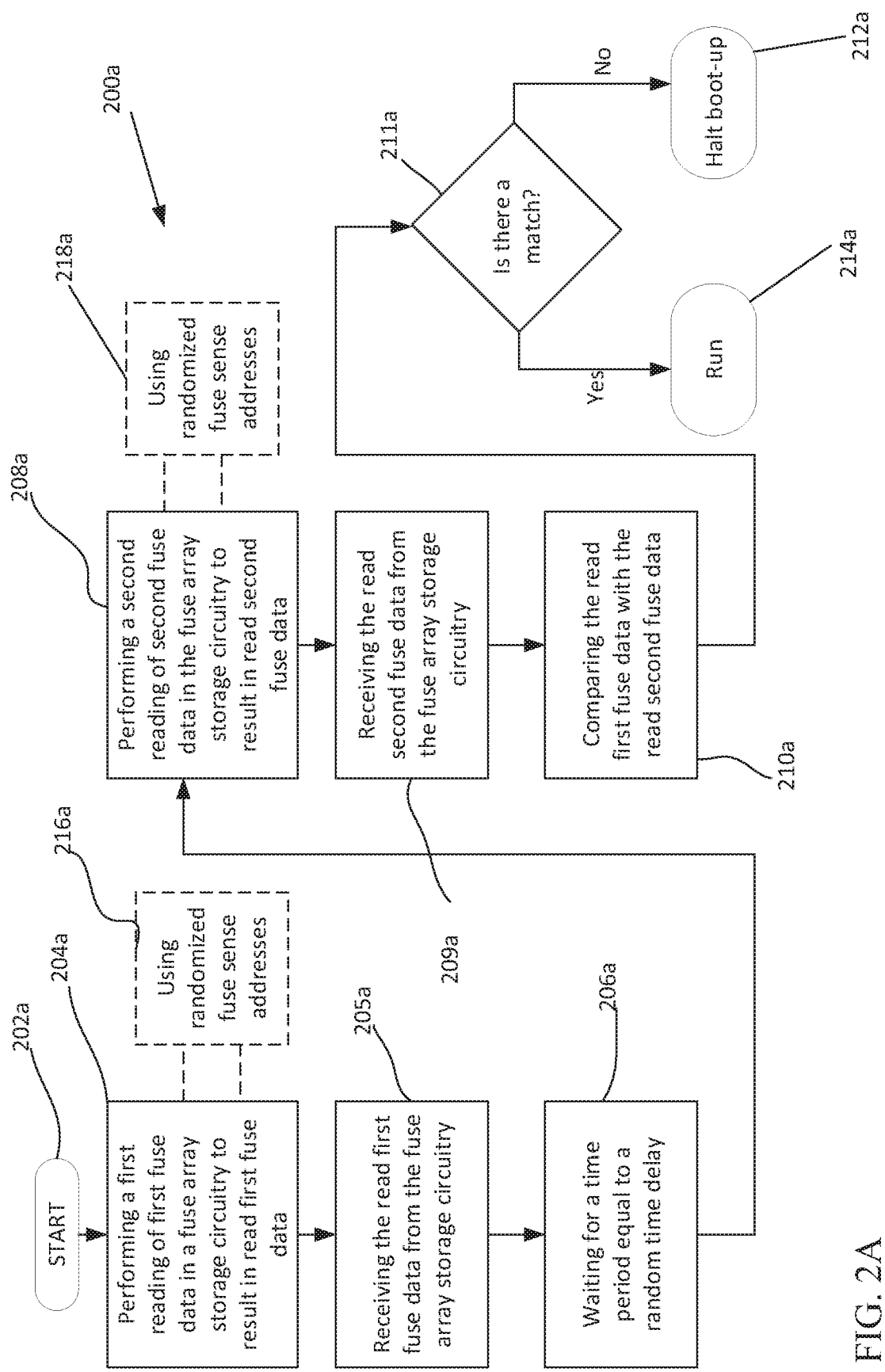
FIG. 2A is a simplified flow chart illustrating example operations associated with providing a secure fuse sense process through a fuse controller according to some embodiments.
Figure 2B:
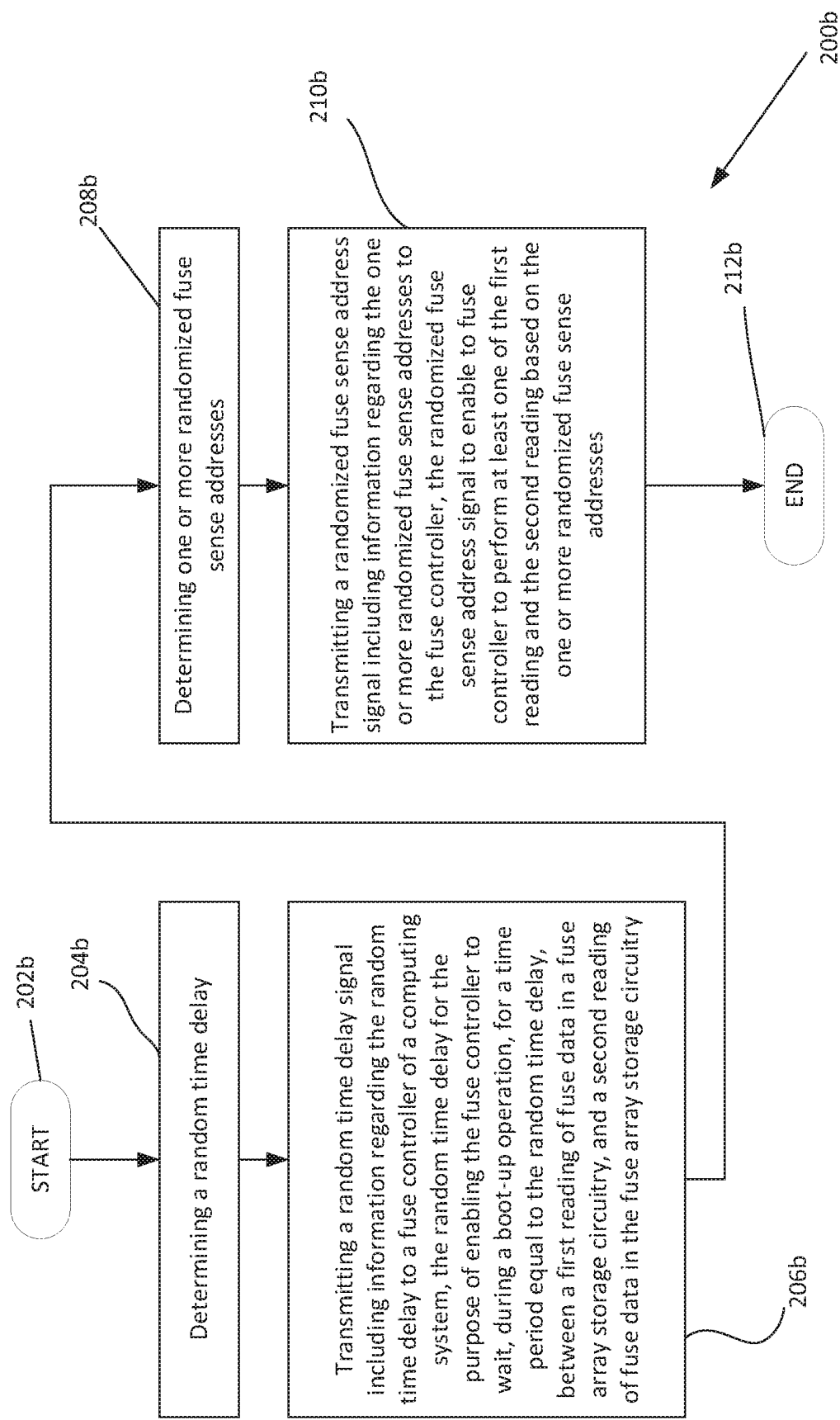
FIG. 2B is a simplified flow chart illustrating example operations associated with providing a secure fuse sense process through a random number generator circuitry according to some embodiments.

Turning now to FIGS. 2A and 2B, these figures depict respective flowcharts showing exemplary embodiments of a processes according to some embodiments. The process 200a of FIG. 2A could be used, by way of example and not limitation, to operate a fuse sensing circuitry such as the fuse sense circuitry 100 of FIG. 1. As a result, the process 200a of FIG. 2A will be described herein in the context of the fuse controller of FIG. 1, although it is understood that embodiments are not so limited. FIG. 2A corresponds to a process that denotes exemplary operations that may take place at a fuse controller, such as fuse controller 104, according to some demonstrative embodiments. The process 200b of FIG. 2B could be used, by way of example and not limitation, to operate a random number generator circuitry such as the random number generator circuitry 108 of FIG. 1. As a result, the process 200b of FIG. 2B will be described herein in the context of the random number generator circuitry of FIG. 1, although it is understood that embodiments are not so limited. FIG. 2B corresponds to a process that denotes exemplary operations that may take place at a random number generator circuitry, such as random number generator circuitry 108, according to some demonstrative embodiments.

As seen in FIGS. 1 and 2A, a process 200a according to embodiments includes, at operation 202a, starting the boot-up process, for example as a result of a boot-up signal 110 communicated to the fuse sense circuitry 100. Thereafter, process 200a at operation 204a includes performing a first reading of first fuse data from the fuse array storage circuitry 102, using for example read signal 112. The "first fuse data" is "first" since it corresponds to fuse data being read/sensed at the time of performing the first reading. Process 200a at operation 205a includes receiving the read first fuse data from the fuse array storage circuitry. At operation 206a, the process 200a includes waiting for a time period equal to a random time-delay elapsed from a time of performing the first reading. This random time-delay may, according to embodiments, be from any reference point in time based the time during which the first reading takes place, for example at a reference point in time when the first reading ends, or at a reference point in time when the first reading begins, or at any reference point in time therebetween. At operation 208a, the process 200a includes performing a second reading of second fuse data from the fuse array storage circuitry 102, using for example read signal 112. The "second fuse data" is "second" since it corresponds to fuse data being read/sensed at the time of performing the second reading. At operation 209a, process 200a includes receiving the read second fuse data from the fuse array storage circuitry. At operation 210a, process 200a includes comparing the read first fuse data with the read second fuse data to determine whether a match exists. In response to a determination at 211a that a match does not exist, at operation 212a, the process 200a includes halting a boot-up of the computing system within which the fuse controller is located. In response to a determination that a match does exist, at operation 214a, the process 200a includes allowing the boot-up of the computing system to continue.

Referring still to FIGS. 1 and 2A, the fuse controller 104 may transmit the read first fuse data and the read second fuse data to the memory 106 through I/O interface 107 and through signals 116 prior to the fuse controller 104 comparing the read first fuse data and the read second fuse data to make a determination regarding whether hacking has taken place. In addition, the fuse controller 104 may receive a random time-delay signal 120 from the random number generator circuitry 108 to allow it to determine the random time-delay and to wait for the time period corresponding to the same at operation 206a.

Referring still to FIGS. 1 and 2A, the process 200a may optionally involve, at operation 216a, using one or more randomized fuse sense addresses within the fuse array storage circuitry 102 to perform the first reading. In addition, the process 200a may optionally involve, at operation 218a, using one or more randomized fuse sense addresses within the fuse array storage circuitry 102 to perform the second reading. The one or more randomized fuse sense addresses in operations 216a and/or 218a may be based on a randomized ordering for a reading of all of the fuse sense addresses 103 within fuse array storage circuitry 102, in which case the one or more randomized fuse sense addresses would include a plurality of randomized fuse sense addresses, as an order of all fuse sense addresses would have been randomized. In particular, the random number generator circuitry 108 may signal to the fuse controller 104 to perform the first reading and/or the second reading in a completely random order of fuse sense addresses 103 within the fuse array storage circuitry 102. By way of example, if there are 16 fuse addresses A1-A16, the randomized ordering may result in the 16 addresses to be order in any order, for example, A13, A12, A15, A11, A2, A8, A1, A7, A6, A4, A14, A9, A3, A10, A16 and A5, in that random order. In the alternative, the one or more randomized fuse sense addresses in operations 216a and/or 218a may be based on a single randomized fuse sense address, for example, on a random fuse sense starting address for reading fuse data in the fuse array storage circuitry 102. The random number generator circuitry 108 in this case may transmit a randomized address signal 125 to the fuse controller 104 which includes a random fuse sense starting address for at least one of the first reading or the second reading. For example, using still the example of the 16 fuse sense addresses A1-A16, the signal 125 may include information regarding a randomized starting address such as A5. In such an example, the fuse controller 104 would perform a reading of the fuse data in the fuse array storage circuitry 102 starting at fuse sense address A5, and then subsequently reading remaining fuse data at fuse sense addresses that sequentially follow an order of fuse sense addresses in the fuse array storage circuitry 102 after address A5 and up address A5, namely, subsequently reading remaining fuse sense data at A6, A7, A8, A9, A10, A11, A12, A13, A14, A15, A16, A1, A2, A3, A4 and A5, in that order, that is, until all fuse data in all fuse sense addresses in the fuse array storage circuitry 102 has been read. According to some embodiments, the random fuse sense starting address may be the same for both the first reading and the second reading, or it may be different as between the first reading and the second reading. According to some embodiments, process 200a may include only one of operations 214a and 218a.

As seen in FIGS. 1 and 2B, a process 200b according to some demonstrative embodiments includes, at operation 202b, a start of a randomization process brought about for example by way of a boot-up signal, such as boot-up signal 110 of FIG. 1. Thereafter, at operation 204b, process 200b includes determining a random time-delay, recalling that process 200b corresponds to the operation of a random number generator circuitry such as random number generator circuitry 108 of FIG. 1. The random time-delay corresponds to the random time-delay described with respect to process 200a of FIG. 2A. At operation 206b, process 200b includes transmitting, through the input/output interface 123 of random number generator circuitry 108, a random time-delay signal including information regarding the random time-delay to the fuse controller 104 of the computing system. The random time-delay signal is to enable the fuse controller 104 to wait, during a single boot-up operation, for a time period equal to the time-delay, between performing a first reading of first fuse data from the fuse array storage circuitry 102 of the computing system and performing a second reading of second fuse data from the fuse array storage circuitry 102. The random number generator circuitry 108 is further to determine, at operation 208b, one or more randomized fuse addresses, and at operation 210b, to transmit, through the input/output interface 123, a randomized fuse sense address signal 125 including information regarding the one or more randomized fuse sense addresses to the fuse controller, the randomized fuse sense address signal to enable to fuse controller to perform at least one of the first reading and the second reading based on the one or more randomized fuse sense addresses. The process 200b is shown as coming to an end, that is, until a next boot-up operation.

Referring still to FIGS. 1 and 2B, the one or more processors are to determine the one or more randomized fuse sense addresses such that the one or more randomized fuse sense addresses are either: (1) based on a randomized ordering for a reading by the fuse controller of all fuse sense addresses in the fuse array storage circuitry, or (2) based on a random fuse sense starting address for reading fuse data in the fuse array storage circuitry. The concept of randomized ordering and of a random fuse sense starting address has already been explained in the paragraphs above.

Advantageously, based on some demonstrative embodiments, if a hacker injects fault after a random delay period, the value of the read second fuse data will be different from the value of the read first fuse data, which difference can be detected as an attack. Moreover, embodiments enable the provision of a fuse sense mechanism that can be robustly scaled as process nodes shrink, obviating voltage droop controller issues posed by the prior art. Moreover, using one or more randomized fuse sense addresses, for example a randomized fuse sense starting address, even by itself, without the use of a random time-delay, can provide enough randomness in the fuse sense process to significantly reduce the chances of an attack. The random time-delay, when combined with using one or more randomized fuse sense addresses, can additionally make it extremely difficult for an attacker to guess the best way to introduce voltage pulses into the fuse sense power rail to try to alter the fuse sense data, in this way making the boot-up process much more robust as compared with the prior art.

Figure 3:
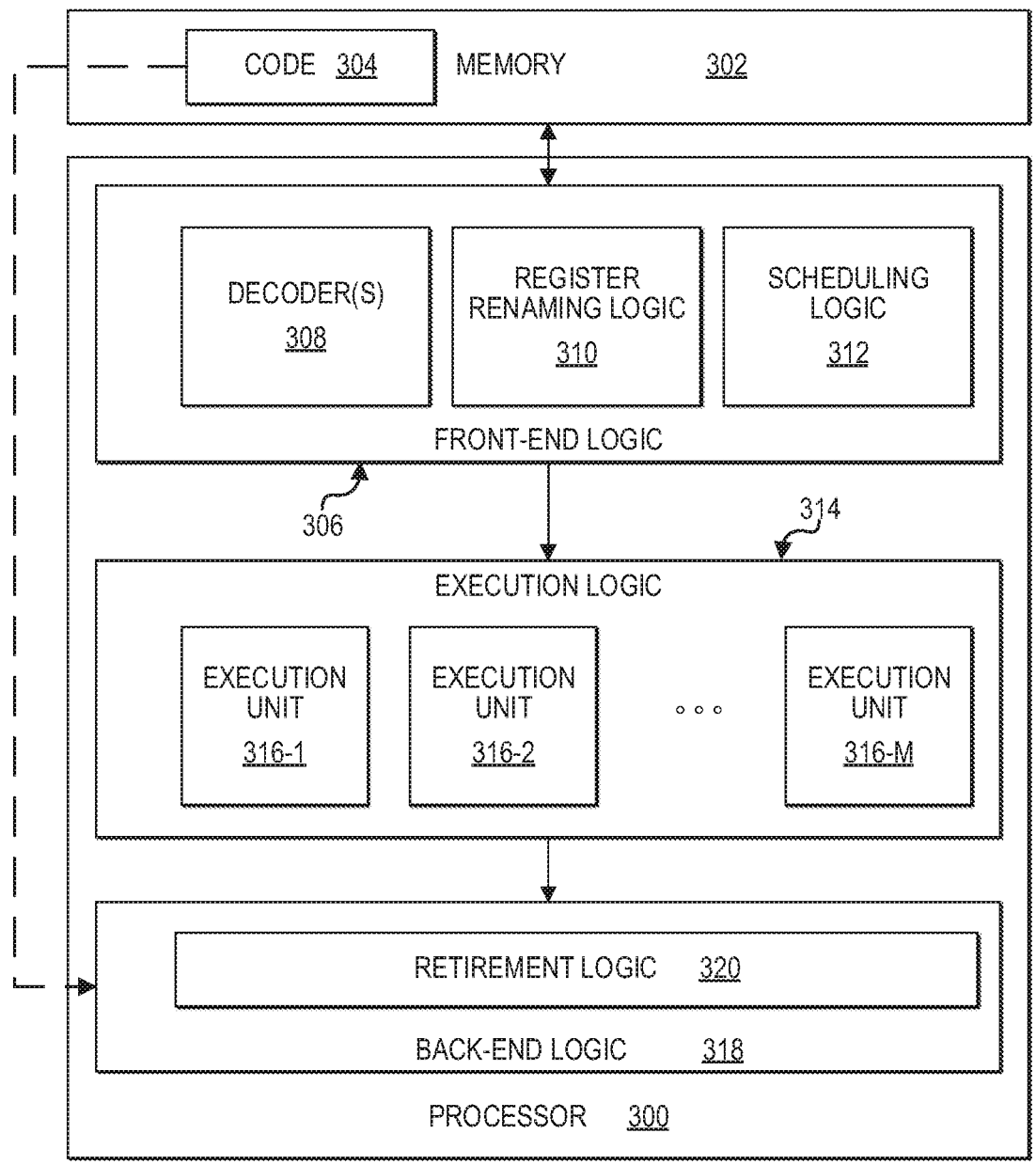
FIG. 3 is a block diagram illustrating an example processor core and memory according to at least one embodiment.
Figure 4:
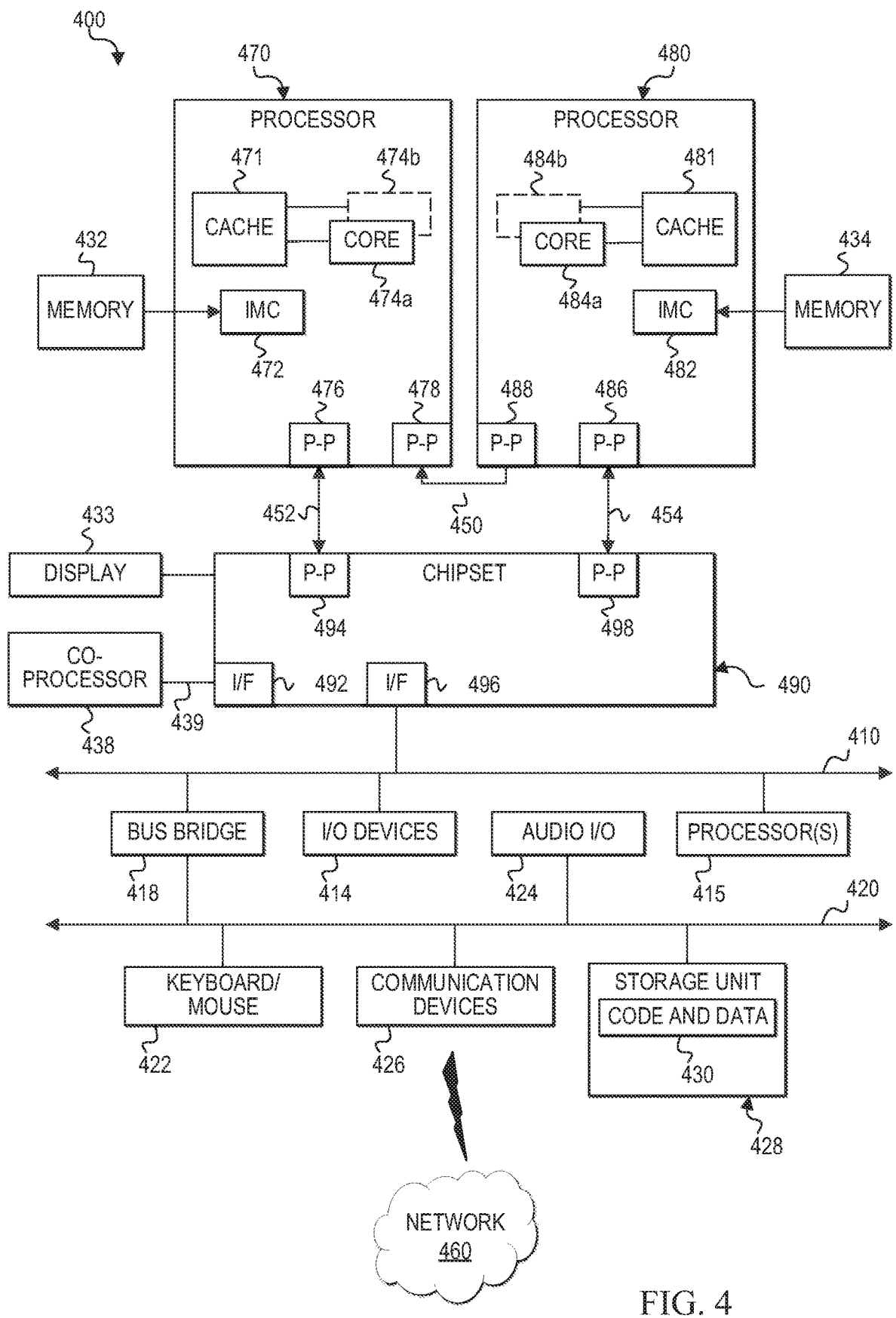
FIG. 4 is a block diagram of an example computing system according to at least one embodiment.
Figure 5:
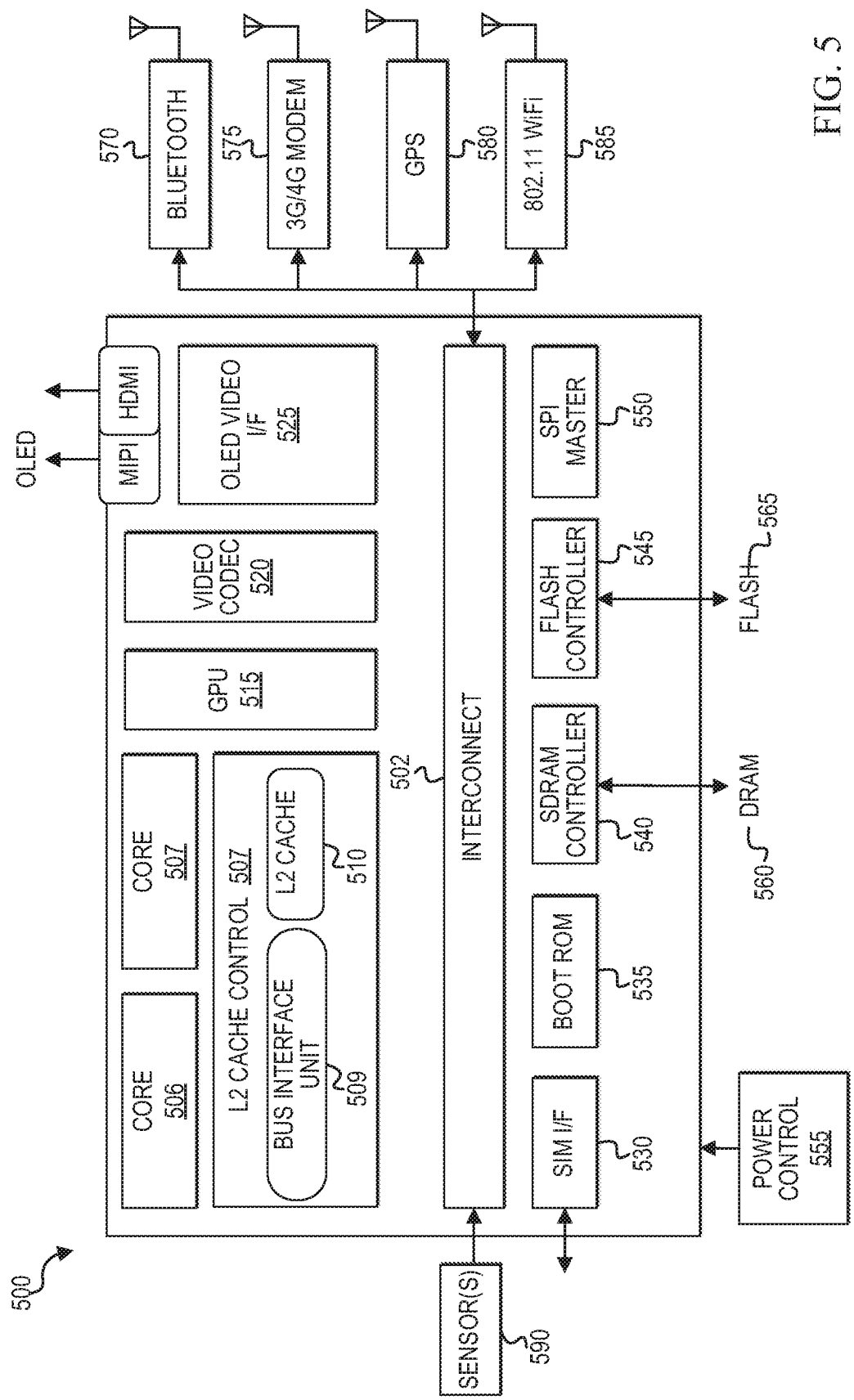
FIG. 5 is a block diagram of an example system-on-a-chip (SoC) computer architecture for a computing system according to at least one embodiment.

FIGS. 3-5 detail exemplary architectures and systems to implement embodiments of the above (such as fuse sense circuitry 100 of FIG. 1, or operations as described in FIGS. 2A and 2B). FIGS. 3-5 show by way of example computing systems that may include a fuse sense circuitry such as fuse sense circuitry 100 of FIG. 1. One or more of the processors in FIGS. 3-5 may be adapted to perform the functions of one or more of a fuse controller or a random number generator circuitry according to embodiments. In some embodiments, one or more hardware components and/or instructions described above are emulated as detailed below, or implemented as software modules. Other computer architecture designs known in the art for processors, mobile devices, computing systems, and components thereof may also (or alternatively) be used. Generally, suitable computer architectures for embodiments disclosed herein can include, but are not limited to, configurations illustrated in FIGS. 3-5.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. An exemplary processor core is described next followed by computer architectures.

FIG. 3 is an example illustration of a processor according to an embodiment. Processor 300 is one example embodiment of processors that may be used in embodiments herein such as the fuse controller 104 or in random number generator circuitry 108 of FIG. 1. Processor 300 may be any type of processor, such as a microprocessor, an embedded processor, a digital signal processor (DSP), a network processor, a multi-core processor, a single core processor, or other device to execute code. Although only one processor 300 is illustrated in FIG. 3, a processing element may alternatively include more than one of processor 300 illustrated in FIG. 3. Processor 300 may be a single-threaded core or, for at least one embodiment, the processor 300 may be multi-threaded in that it may include more than one hardware thread context (or "logical processor") per core.

FIG. 3 also illustrates a memory 302 coupled to processor 300 in accordance with an embodiment. Memory 302 is one example of memory elements including at least one of the fuse sense array circuitry 102 or the memory 106 of FIG. 1. Memory 302 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM). Processor 300 can execute any type of instructions associated with the monitoring and analyzing operations detailed herein. Generally, processor 300 can transform an element or an article (e.g., data) from one state or thing to another state or thing.

Code 304, which may be one or more instructions to be executed by processor 300, may be stored in memory 302. Code 304 can include instructions corresponding to various operations (e.g., the operations shown in FIG. 2A or 2B) that may be stored in software, hardware, firmware, or any suitable combination thereof, or in any other internal or external component, device, element, or object where appropriate and based on particular needs. In one example, processor 300 can follow a program sequence of instructions indicated by code 304. Each instruction enters a front-end logic 306 and is processed by one or more decoders 308. The decoder may generate, as its output, a micro operation such as a fixed width micro operation in a predefined format, or may generate other instructions, microinstructions, or control signals that reflect the original code instruction. Front-end logic 306 also includes register renaming logic 310 and scheduling logic 312, which generally allocate resources and queue the operation corresponding to the instruction for execution.

Processor 300 can also include execution logic 314 having a set of execution units 316-1 through 316-M. Some embodiments may include a number of execution units dedicated to specific functions or sets of functions. Other embodiments may include only one execution unit or one execution unit that can perform a particular function. Execution logic 314 performs the operations specified by code instructions.

After completion of execution of the operations specified by the code instructions, back-end logic 318 can retire the instructions of code 304. In one embodiment, processor 300 allows out of order execution but requires in order retirement of instructions. Retirement logic 320 may take a variety of known forms (e.g., re-order buffers or the like). In this manner, processor 300 is transformed during execution of code 304, at least in terms of the output generated by the decoder, hardware registers and tables utilized by register renaming logic 310, and any registers (not shown) modified by execution logic 314.

Although not shown in FIG. 3, a processing element may include other elements on a chip with processor 300. For example, a processing element may include memory control logic along with processor 300. The processing element may include I/O control logic and/or may include I/O control logic integrated with memory control logic. The I/O control logic may control the operation of an I/O interface such as that of the fuse controller 104 or random number generator circuitry 108 of FIG. 1. The processing element may also include one or more caches. In some embodiments, non-volatile memory (such as flash memory or fuses) may also be included on the chip with processor 300.

FIGS. 4 and 5 are block diagrams of exemplary computer architectures of a computing system, such as a computing system including the fuse sense circuitry 100 of FIG. 1. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable. In general, a huge variety of systems or electronic devices capable of incorporating a processor and/or other execution logic as disclosed herein are generally suitable.

Referring now to FIG. 4, shown is a block diagram of an example computing system 400 in accordance with one or more embodiments of the present disclosure. As shown in FIG. 4, multiprocessor system 400 is a point-to-point interconnect system, and includes a first processor 470 and a second processor 480 coupled via a point-to-point interconnect 450. In at least one embodiment, the processors in at least one of fuse controller 104 or random number generator circuitry 108, as shown and described herein, may be configured in the same or similar manner as the processors in exemplary computing system 400. Processors 470 and 480 may be any type of processor, such as those discussed with reference to processors of FIG. 1, and processor 300 of FIG. 3.

Processors 470 and 480 may be implemented as single core processors 474a and 484a or multi-core processors 474a-474b and 484a-484b. Processors 470 and 480 may each include a cache 471 and 481 used by their respective core or cores. A shared cache (not shown) may be included in either processors or outside of both processors, yet connected with the processors via P-P interconnect, such that either or both processors' local cache information may be stored in the shared cache if a processor is placed into a low power mode.

Processors 470 and 480 are shown including integrated memory controller (IMC) units 472 and 482, respectively. IMCs 472 and 482 couple the processors to respective memories, namely a memory 432 and a memory 434, which may be portions of main memory locally attached to the respective processors. In alternative embodiments, memory controller logic 472 and 482 may be discreet logic separate from processors 470 and 480. Memory elements 432 and/or 434 may store various data to be used by processors 470 and 480 in achieving operations associated with a fuse sense circuitry, such as fuse sense circuitry 100 of FIG. 1, as outlined herein.

Processor 470 also includes as part of its bus controller units, point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439 by via of I/F interface 492. In one embodiment, the coprocessor 438 is a special-purpose processor, such as, for example, a high-throughput MIC processor, a network or communication processor, compression engine, graphics processor, GPGPU, embedded processor, or the like. Chipset 490 may also communicate with a display 433 for displaying data that is viewable by a human user.

As shown herein, chipset 490 is separated from processing elements 470 and 480. However, in an embodiment, chipset 490 is integrated on the same chip as processing elements 470 and 480. Also, chipset 490 may be partitioned differently with fewer or more integrated circuits.

Chipset 490 may be coupled to a first bus 410 via an interface 496. In one embodiment, first bus 410 may be a Peripheral Component Interconnect (PCI) bus, or a bus such as a PCI Express bus or another third generation I/O interconnect bus, although the scope of the present disclosure is not so limited.

As shown in FIG. 4, various I/O devices 414 may be coupled to first bus 410, along with a bus bridge 418 which couples first bus 410 to a second bus 420. In one embodiment, one or more additional processor(s) 415, such as coprocessors, high-throughput MIC processors, GPGPU's, accelerators (such as, e.g., graphics accelerators or digital signal processing (DSP) units), AI accelerators, field programmable gate arrays, or any other processor, are coupled to first bus 410. I/O devices 414 may include peripheral devices (including sensors) that provide information and/or instructions to processors 470 and 480 for processing or storage. Some peripheral devices also (or alternatively) provide a way for processors 470 and 480 to output information to users or other computing systems. Sensors may include, for example, video and/or still image sensors, audio sensors, touch sensors, fingerprint sensors, eye sensors, facial features sensors, other biometric sensors, etc. In one example, sensors detect user authentication input and in accordance with at least one embodiment, encrypt the input using the current symmetric key, and provide the symmetric-key encrypted user authentication input to processors 470 and 480.

In one embodiment, second bus 420 may be a low pin count (LPC) bus. Various devices may be coupled to a second bus 420 including, for example, a keyboard and/or mouse 422 (or other input devices such as a touch screen, trackball, joystick, etc.), communication devices 426 (such as modems, network interface devices, or other types of communication devices that may communicate through a network 460), and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

The computing system depicted in FIG. 4 is a schematic illustration of an embodiment that may be utilized to implement various embodiments discussed herein. It will be appreciated that various components of the system depicted in FIG. 4 may be combined in a system-on-a-chip (SoC) architecture or in any other suitable configuration capable of achieving the protection of communications between a sensor and a computing platform using symmetric key cryptography, according to the various embodiments provided herein.

Turning to FIG. 5, FIG. 5 is a simplified block diagram associated with an example Advanced RISC Machines (ARM) ecosystem system-on-chip (SOC) 500 of the present disclosure. At least one example implementation of the present disclosure can include the fuse sense circuitry, such as fuse sense circuitry 100 discussed herein, and an ARM component. For example, in at least some embodiments, fuse sense circuitry 100, shown and described herein, could be configured in the same or similar manner ARM ecosystem SOC 500. Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, wearable electronic device, any type of touch-enabled input device, etc.

In this example of FIG. 5, ARM ecosystem SOC 500 may include multiple cores 506-507, an L2 cache control 507, a bus interface unit 509, an L2 cache 510, a graphics processing unit (GPU) 515, an interconnect 502, a video codec 520, and an organic light emitting diode (OLED) I/F 525, which may be associated with mobile industry processor interface (MIPI)/high-definition multimedia interface (HDMI) links that couple to an OLED display.

ARM ecosystem SOC 500 may also include a subscriber identity module (SIM) I/F 530, a boot read-only memory (ROM) 535, a synchronous dynamic random access memory (SDRAM) controller 540, a flash controller 545, a serial peripheral interface (SPI) master 550, a suitable power control 555, a dynamic RAM (DRAM) 560, flash 565, and one or more sensors 590. In addition, one or more example embodiments include one or more communication capabilities, interfaces, and features such as instances of Bluetooth™ 570, a 3G modem 575, a global positioning system (GPS) 580, and an 802.11 Wi-Fi 585.

In operation, the example of FIG. 5 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Embodiments of the mechanisms disclosed herein may be implemented in hardware, software, firmware, or a combination of such implementation approaches. Embodiments of this disclosure may be implemented, at least in part, as computer programs or program code executing on programmable systems comprising at least one processor, a storage system (including volatile and non-volatile memory and/or storage elements), at least one input device, and at least one output device.

Program code (e.g., 304, 430), may be applied to input instructions to perform at least some of the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor, among other examples.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk re-writables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Note that with the numerous examples provided herein, interaction may be described in terms of two, three, four, or more devices, modules, engines, and/or other components. However, this has been done for purposes of clarity and example only. It should be appreciated that the fuse sense circuitry according to embodiments can be divided (e.g., segmented, partitioned, separated, etc.) in any suitable manner. For example, FUSE ARRAY STORAGE CIRCUITRY 102, FUSE CONTROLLER 104, random number generator circuitry 108, memory 106 and/or voltage supply circuitry 114, may be provided in alternative configurations such that multiple hosts, nodes, network elements, devices, etc., coordinate to perform the activities one or various combinations of the above components. It should be appreciated that the embodiments illustrated in FIGS. 1 and 2A/2B (and their teachings) are readily scalable and can accommodate a large number of components, as well as more complicated/sophisticated arrangements and configurations. Accordingly, the examples provided should not limit the scope or inhibit the broad teachings of the systems as potentially applied to a myriad of other architectures.

It is also important to note that the operations described with reference to the preceding FIGURES illustrate only some of the possible scenarios that may be executed by, or within, a fuse sense circuitry, such as fuse sense circuitry 100 of FIG. 1. Some of these operations may be deleted or removed where appropriate, or these operations may be modified or changed considerably without departing from the scope of the discussed concepts. In addition, the timing of these operations may be altered considerably and still achieve the results taught in this disclosure. As one example, the processes depicted in the accompanying figures do not necessarily require the particular order shown, or sequential order, to achieve the desired results. In certain implementations, multitasking and parallel processing may be advantageous. The preceding operational flows have been offered for purposes of example and discussion. Substantial flexibility is provided by the system in that any suitable arrangements, chronologies, configurations, and timing mechanisms may be provided without departing from the teachings of the discussed concepts.

As used herein, unless expressly stated to the contrary, use of the phrase 'at least one of' refers to any combination of the named items, elements, conditions, or activities. For example, 'at least one of X, Y, or Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Unless expressly stated to the contrary, the numbering adjectives 'first', 'second', 'third', etc., are intended to distinguish the particular terms (e.g., element, condition, module, activity, operation, claim element, etc.) they precede, but are not intended to indicate any type of order, rank, importance, temporal sequence, or hierarchy of the modified term. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments of the subject matter disclosed herein. Certain features that are described in this specification in the context of separate embodiments can also be implemented in combination in a single embodiment. Conversely, various features that are described in the context of a single embodiment may also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

OTHER NOTES AND EXAMPLES

The following examples pertain to embodiments in accordance with this specification.

Example 1 is an apparatus of a computing system, the apparatus comprising one or more processors, and an input/output interface connected to the one or more processors to communicate signals from and to the one or more processors, the one or more processors to: perform a first reading of first fuse data stored in a fuse array storage circuitry to result in read first fuse data, and receive the read first fuse data from the fuse array storage circuitry through the input/output interface; after a random time-delay has elapsed from performing the first reading, perform a second reading of second fuse data stored in the fuse array storage circuitry to result in read second fuse data, and receive the read second fuse data from the fuse array storage circuitry through the input/output interface; and compare the read first fuse data with the read second fuse data, and in response to a determination that the read first fuse data and the read second fuse data do not match, halt a boot-up of the computing system.

Example 2 includes the subject matter of Example 1, and optionally, wherein the one or more processors are to, prior to comparing, transmit, through the input/output interface, the read first fuse data to a memory for the read first fuse data to be stored in the memory.

Example 3 includes the subject matter of Example 1, and optionally, wherein the one or more processors are to determine the random time-delay from a random time-delay signal received from a random number generator circuitry through the input/output interface.

Example 4 includes the subject matter of Example 2, and optionally, wherein the one or more processors are to use one or more randomized fuse sense addresses within the fuse array storage circuitry to at least one of perform the first reading or perform the second reading.

Example 5 includes the subject matter of Example 4, and optionally, wherein the one or more processors are to determine the one or more randomized fuse sense addresses from a randomized address signal received from a random number generator circuitry through the input/output interface.

Example 6 includes the subject matter of Example 4, and optionally, wherein the one or more randomized fuse sense addresses are based on a randomized ordering for a reading of all fuse sense addresses in the fuse array storage circuitry.

Example 7 includes the subject matter of Example 4, and optionally, wherein: the one or more randomized fuse sense addresses are based on a random fuse sense starting address for reading fuse data in the fuse array storage circuitry; and the one or more processors are to at least one of perform the first reading or perform the second reading by first reading fuse data at the random fuse sense starting address, and by subsequently reading remaining fuse data at fuse sense addresses that sequentially follow an order of fuse sense addresses in the fuse array storage circuitry after the random fuse sense starting address and up to the random fuse sense starting address until fuse data at all fuse sense addresses in the fuse array storage circuitry has been read.

Example 8 includes the subject matter of Example 1, and optionally, further including the fuse array storage circuitry.

Example 9 includes the subject matter of Example 2, and optionally, further including the memory, wherein the memory includes a Random Access Memory.

Example 10 includes the subject matter of Example 3, and optionally, further including the random number generator circuitry.

Example 11 includes the subject matter of Example 1, and optionally, further including the fuse array storage circuitry, a memory, a random number generator circuitry, and a central processing unit (CPU), the device further being configured to control a boot-up of the CPU.

Example 12 includes a product comprising one or more tangible computer-readable non-transitory storage media comprising computer-executable instructions operable to, when executed by at least one computer processor, cause the at least one computer processor to implement operations at a computing system, the operations comprising: performing a first reading of first fuse data stored in a fuse array storage circuitry to result in read first fuse data, and receiving the read first fuse data from the fuse array storage circuitry; after a random time-delay has elapsed from performing the first reading, performing a second reading of second fuse data stored in the fuse array storage circuitry to result in read second fuse data, and receiving the read second fuse data from the fuse array storage circuitry; and comparing the read first fuse data with the read second fuse data, and in response to a determination that the read first fuse data and the read second fuse data do not match, halting a boot-up of the computing system.

Example 13 includes the subject matter of Example 12, and optionally, wherein the operations further include, prior to comparing, transmitting the read first fuse data to a memory for the read first fuse data to be stored in the memory.

Example 14 includes the subject matter of Example 12, and optionally, wherein the operations further include determining the random time-delay from a random time-delay signal received from a random number generator circuitry.

Example 15 includes the subject matter of Example 12, and optionally, wherein the operations further include using one or more randomized fuse sense addresses within the fuse array storage circuitry to at least one of perform the first reading or perform the second reading.

Example 16 includes the subject matter of Example 15, and optionally, wherein the operations further include determining the one or more randomized fuse sense addresses from a randomized address signal received from a random number generator circuitry.

Example 17 includes the subject matter of Example 15, and optionally, wherein the one or more randomized fuse sense addresses are based on a randomized ordering for a reading of all fuse sense addresses in the fuse array storage circuitry.

Example 18 includes the subject matter of Example 15, and optionally, wherein: the one or more randomized fuse sense addresses are based on a random fuse sense starting address for reading fuse data in the fuse array storage circuitry; and the operations further include at least one of performing a reading of the first fuse data or performing a reading of the second fuse data by first reading fuse data at the random fuse sense starting address, and by subsequently reading remaining fuse data at fuse sense addresses that sequentially follow an order of fuse sense addresses after the random fuse sense starting address and back up to the random fuse sense starting address until fuse data at all fuse sense addresses in the fuse array storage circuitry has been read.

Example 19 includes a method, the method comprising: performing a first reading of first fuse data stored in a fuse array storage circuitry of a computing system to result in read first fuse data, and receiving the read first fuse data from the fuse array storage circuitry; after a random time-delay has elapsed from performing the first reading, performing a second reading of second fuse data stored in the fuse array storage circuitry to result in read second fuse data, and receiving the read second fuse data from the fuse array storage circuitry; and comparing the read first fuse data with the read second fuse data, and in response to a determination that the read first fuse data and the read second fuse data do not match, halting a boot-up of a computing system.

Example 20 includes the subject matter of Example 19, and optionally, further including, prior to comparing, transmitting the read first fuse data to a memory of the computing system for the read first fuse data to be stored in the memory.

Example 21 includes the subject matter of Example 19, and optionally, further including using one or more randomized fuse sense addresses within the fuse array storage circuitry to at least one of perform the first reading or perform the second reading.

Example 22 includes the subject matter of Example 21, and optionally, wherein the one or more randomized fuse sense addresses are based on a randomized ordering for a reading of all fuse sense addresses in the fuse array storage circuitry.

Example 23 includes the subject matter of Example 21, and optionally, wherein: the one or more randomized fuse sense addresses are based on a random fuse sense starting address for reading fuse data in the fuse array storage circuitry; and the method includes at least one of performing a reading of the first fuse data or performing a reading of the second fuse data by first reading fuse data at the random fuse sense starting address, and by subsequently reading remaining fuse data at fuse sense addresses that sequentially follow an order of fuse sense addresses after the random fuse sense starting address and back up to the random fuse sense starting address until fuse data at all fuse sense addresses in the fuse array storage circuitry has been read.

Example 24 includes a device of a computing system, the device including: means for performing a first reading of first fuse data stored in a fuse array storage circuitry of a computing system to result in read first fuse data, and receiving the read first fuse data from the fuse array storage circuitry; means for performing, after a random time-delay has elapsed from performing the first reading, a second reading of second fuse data stored in the fuse array storage circuitry to result in read second fuse data, and receiving the read second fuse data from the fuse array storage circuitry; and means for comparing the read first fuse data with the read second fuse data, and in response to a determination that the read first fuse data and the read second fuse data do not match, halting a boot-up of a computing system.

Example 25 includes the subject matter of Example 24, and optionally, further including means for using one or more randomized fuse sense addresses within the fuse array storage circuitry to at least one of perform the first reading or perform the second reading.

Example 26 includes the subject matter of Example 25, and optionally, wherein the one or more randomized fuse sense addresses are based on a randomized ordering for a reading of all fuse sense addresses in the fuse array storage circuitry.

Example 27 includes the subject matter of Example 25, and optionally, wherein: the one or more randomized fuse sense addresses are based on a random fuse sense starting address for reading fuse data in the fuse array storage circuitry; and the device further includes means for at least one of performing a reading of the first fuse data or performing a reading of the second fuse data by first reading fuse data at the random fuse sense starting address, and by subsequently reading remaining fuse data at fuse sense addresses that sequentially follow an order of fuse sense addresses after the random fuse sense starting address and back up to the random fuse sense starting address until fuse data at all fuse sense addresses in the fuse array storage circuitry has been read.

Example 28 includes the subject matter of Example 24, and optionally, further including means for transmitting, prior to comparing, the read first fuse data to a memory of the computing system for the read first fuse data to be stored in the memory.

Example 29 includes a device of a computing system, the device comprising one or more processors, and an input/output interface connected to the one or more processors to communicate signals from and to the one or more processors, the one or more processors to: determine a random time-delay; and transmit, through the input/output interface, a random time-delay signal including information regarding the random time-delay to a fuse controller of the computing system, the random time-delay signal to enable the fuse controller to wait, during a single boot-up operation, for a time period equal to the time-delay, between performing a first reading of first fuse data from a fuse array storage circuitry of the computing system and performing a second reading of second fuse data from the fuse array storage circuitry.

Example 30 includes the subject matter of Example 29, and optionally, wherein the one or more processors are to: determine one or more randomized fuse sense addresses; and transmit, through the input/output interface, a randomized fuse sense address signal including information regarding the one or more randomized fuse sense addresses to the fuse controller, the randomized fuse sense address signal to enable to fuse controller to perform at least one of the first reading and the second reading based on the one or more randomized fuse sense addresses.

Example 31 includes the subject matter of Example 30, and optionally, wherein the one or more processors are to determine the one or more randomized fuse sense addresses such that the one or more randomized fuse sense addresses are based on a randomized ordering for a reading of all fuse sense addresses in the fuse array storage circuitry.

Example 32 includes the subject matter of Example 30, and optionally, wherein the one or more processors are to determine the one or more randomized fuse sense addresses such that the one or more randomized fuse sense addresses are based on a random fuse sense starting address for reading fuse data in the fuse array storage circuitry.

Example 33 includes the subject matter of Example 29, and optionally, further including the fuse array storage circuitry.

Example 34 includes the subject matter of Example 32, and optionally, further including the fuse controller.

Example 35 includes the subject matter of Example 29, and optionally, further including the fuse array storage circuitry, the fuse controller, and a central processing unit (CPU) coupled to the fuse controller, the fuse controller to control a boot-up of the CPU.

Example 36 includes a product comprising one or more tangible computer-readable non-transitory storage media comprising computer-executable instructions operable to, when executed by at least one computer processor, cause the at least one computer processor to implement operations at a computing system, the operations comprising: determining a random time-delay; and transmitting a random time-delay signal including information regarding the random time-delay to a fuse controller of the computing system, the random time-delay signal to enable the fuse controller to wait, during a single boot-up operation, for a time period equal to the time-delay, between performing a first reading of first fuse data from a fuse array storage circuitry and performing a second reading of second fuse data from the fuse array storage circuitry.

Example 37 includes the subject matter of Example 36, and optionally, wherein the operations further include: determining one or more randomized fuse sense addresses; and transmitting one or more randomized fuse sense addresses signal including information regarding the one or more randomized fuse sense addresses to the fuse controller, the randomized fuse sense address signal to enable to fuse controller to perform at least one of the first reading and the second reading based on the one or more randomized fuse sense addresses.

Example 38 includes the subject matter of Example 37, and optionally, wherein the operations further include determining the one or more randomized fuse sense addresses such that the one or more randomized fuse sense addresses are based on a randomized ordering for a reading of all fuse sense addresses in the fuse array storage circuitry.

Example 39 includes the subject matter of Example 37, and optionally, wherein the operations further include determining the one or more randomized fuse sense addresses such that the one or more randomized fuse sense addresses are based on a random fuse sense starting address for reading fuse data in the fuse array storage circuitry.

Example 40 includes a method to be performed at an device of a computing system, the method comprising: determining a random time-delay; and transmitting a random time-delay signal including information regarding the random time-delay to a fuse controller of the computing system, the random time-delay signal to enable the fuse controller to wait, during a single boot-up operation, for a time period equal to the time-delay, between performing a first reading of first fuse data from a fuse array storage circuitry and performing a second reading of second fuse data from the fuse array storage circuitry.

Example 41 includes the subject matter of Example 40, and optionally, further including: determining one or more randomized fuse sense addresses; and transmitting a randomized fuse sense address signal including information regarding the one or more randomized fuse sense addresses to the fuse controller, the randomized fuse sense address signal to enable to fuse controller to perform at least one of the first reading and the second reading based on the one or more randomized fuse sense addresses.

Example 42 includes the subject matter of Example 41, and optionally, further including determining the one or more randomized fuse sense addresses such that the one or more randomized fuse sense addresses are based on a randomized ordering for a reading of all fuse sense addresses in the fuse array storage circuitry.

Example 43 includes the subject matter of Example 40, and optionally, further including: determining the one or more randomized fuse sense addresses such that randomized fuse sense addresses are based on a random fuse sense starting address for reading fuse data in the fuse array storage circuitry; and at least one of performing a reading of the first fuse data or performing a reading of the second fuse data by first reading fuse data at the random fuse sense starting address, and by subsequently reading remaining fuse data at fuse sense addresses that sequentially follow an order of fuse sense addresses after the random fuse sense starting address and back up to the random fuse sense starting address until fuse data at all fuse sense addresses in the fuse array storage circuitry has been read.

Example 44 includes a device of a computing system, the device comprising: means for determining a random time-delay; and means for transmitting a random time-delay signal including information regarding the random time-delay to a fuse controller of the computing system, the random time-delay signal to enable the fuse controller to wait, during a single boot-up operation, for a time period equal to the time-delay, between performing a first reading of first fuse data from a fuse array storage circuitry and performing a second reading of second fuse data from the fuse array storage circuitry.

Example 45 includes the subject matter of Example 44, and optionally, further including: means for determining one or more randomized fuse sense addresses; and means for transmitting a randomized fuse sense address signal including information regarding the one or more randomized fuse sense addresses to the fuse controller, the randomized fuse sense address signal to enable to fuse controller to perform at least one of the first reading and the second reading based on the one or more randomized fuse sense addresses.

Example 46 includes the subject matter of Example 45, and optionally, further including means for determining the one or more randomized fuse sense addresses such that the one or more randomized fuse sense addresses are based on a randomized ordering for a reading of all fuse sense addresses in the fuse array storage circuitry.

Example 47 includes the subject matter of Example 44, and optionally, further including: means for determining the one or more randomized fuse sense addresses such that randomized fuse sense addresses are based on a random fuse sense starting address for reading fuse data in the fuse array storage circuitry; and means for at least one of performing a reading of the first fuse data or performing a reading of the second fuse data by first reading fuse data at the random fuse sense starting address, and by subsequently reading remaining fuse data at fuse sense addresses that sequentially follow an order of fuse sense addresses after the random fuse sense starting address and back up to the random fuse sense starting address until fuse data at all fuse sense addresses in the fuse array storage circuitry has been read.

What is claimed is:

1. An apparatus of a computing system, the apparatus comprising one or more processors, and an input/output interface connected to the one or more processors to communicate signals from and to the one or more processors, the one or more processors to, in response to a boot-up signal to boot up the computing system:
    perform a first reading of first fuse data stored at a set of fuse sense addresses of a fuse array storage circuitry to result in read first fuse data, and receive the read first fuse data from the fuse array storage circuitry through the input/output interface;
    after a random time-delay has elapsed from performing the first reading, perform a second reading of second fuse data stored at the set of fuse sense addresses of the fuse array storage circuitry to result in read second fuse data, and receive the read second fuse data from the fuse array storage circuitry through the input/output interface; and
    compare the read first fuse data with the read second fuse data, and in response to a determination that the read first fuse data and the read second fuse data do not match, halt the boot-up of the computing system;
    wherein the one or more processors are to use one or more randomized fuse sense addresses of the set of fuse sense addresses within the fuse array storage circuitry to at least one of perform the first reading or perform the second reading, each of the one or more randomized fuse sense addresses including a combination of a row address and a column address.

2. The apparatus of claim 1, wherein the one or more processors are to, prior to comparing, transmit, through the input/output interface, the read first fuse data to a memory for the read first fuse data to be stored in the memory.

3. The apparatus of claim 1, wherein the one or more processors are to determine the random time-delay from a random time-delay signal received from a random number generator circuitry through the input/output interface.

4. The apparatus of claim 1, wherein the one or more processors are to determine the one or more randomized fuse sense addresses from a randomized address signal received from a random number generator circuitry through the input/output interface.

5. The apparatus of claim 1, wherein the one or more randomized fuse sense addresses are based on a randomized ordering for a reading of all fuse sense addresses in the fuse array storage circuitry.

6. The apparatus of claim 1, wherein:
    the one or more randomized fuse sense addresses are based on a random fuse sense starting address for reading fuse data in the fuse array storage circuitry; and
    the one or more processors are to at least one of perform the first reading or perform the second reading by first reading fuse data at the random fuse sense starting address, and by subsequently reading remaining fuse data at fuse sense addresses that sequentially follow an order of fuse sense addresses in the fuse array storage circuitry after the random fuse sense starting address and up to the random fuse sense starting address until fuse data at all fuse sense addresses in the fuse array storage circuitry has been read.

7. The apparatus of claim 1, further including the fuse array storage circuitry.

8. The apparatus of claim 2, further including the memory, wherein the memory includes a Random Access Memory.

9. The apparatus of claim 3, further including the random number generator circuitry.

10. The apparatus of claim 1, further including the fuse array storage circuitry, a memory, a random number generator circuitry, and a central processing unit (CPU), the apparatus further being configured to control a boot-up of the CPU.

11. A product comprising one or more tangible computer-readable non-transitory storage media comprising computer-executable instructions operable to, when executed by at least one computer processor, cause the at least one computer processor to implement operations at a computing system, the operations comprising in response to a boot-up signal to boot up the computing system:
performing a first reading of first fuse data stored at a set of fuse sense addresses of a fuse array storage circuitry to result in read first fuse data, and receiving the read first fuse data from the fuse array storage circuitry;
after a random time-delay has elapsed from performing the first reading, performing a second reading of second fuse data stored at the set of fuse sense addresses of the fuse array storage circuitry to result in read second fuse data, and receiving the read second fuse data from the fuse array storage circuitry; and
comparing the read first fuse data with the read second fuse data, and in response to a determination that the read first fuse data and the read second fuse data do not match, halting a boot-up of the computing system;
wherein the operations further include using one or more randomized fuse sense addresses of the set of fuse sense addresses within the fuse array storage circuitry to at least one of perform the first reading or perform the second reading, each of the one or more randomized fuse sense addresses including a combination of a row address and a column address.

12. The product of claim 11, wherein the operations further include, prior to comparing, transmitting the read first fuse data to a memory for the read first fuse data to be stored in the memory.

13. The product of claim 11, wherein the operations further include determining the random time-delay from a random time-delay signal received from a random number generator circuitry.

14. The product of claim 11, wherein the operations further include determining the one or more randomized fuse sense addresses from a randomized address signal received from a random number generator circuitry.

15. The product of claim 11, wherein the one or more randomized fuse sense addresses are based on a randomized ordering for a reading of all fuse sense addresses in the fuse array storage circuitry.

16. The product of claim 11, wherein:
the one or more randomized fuse sense addresses are based on a random fuse sense starting address for reading fuse data in the fuse array storage circuitry; and
the operations further include at least one of performing a reading of the first fuse data or performing a reading of the second fuse data by first reading fuse data at the random fuse sense starting address, and by subsequently reading remaining fuse data at fuse sense addresses that sequentially follow an order of fuse sense addresses after the random fuse sense starting address and back up to the random fuse sense starting address until fuse data at all fuse sense addresses in the fuse array storage circuitry has been read.

17. A method, comprising in response to a boot-up signal to boot up the computing system:
performing a first reading of first fuse data stored in a fuse array storage circuitry of a computing system to result in read first fuse data, and receiving the read first fuse data from the fuse array storage circuitry;
after a random time-delay has elapsed from performing the first reading, performing a second reading of second fuse data stored in the fuse array storage circuitry to result in read second fuse data, and receiving the read second fuse data from the fuse array storage circuitry; and
comparing the read first fuse data with the read second fuse data, and in response to a determination that the read first fuse data and the read second fuse data do not match, halting a boot-up of a computing system;
wherein the operations further include using one or more randomized fuse sense addresses of the set of fuse sense addresses within the fuse array storage circuitry to at least one of perform the first reading or perform the second reading, each of the one or more randomized fuse sense addresses including a combination of a row address and a column address.

18. The method of claim 17, further including, prior to comparing, transmitting the read first fuse data to a memory of the computing system for the read first fuse data to be stored in the memory.

19. The method of claim 17, wherein the one or more randomized fuse sense addresses are based on a randomized ordering for a reading of all fuse sense addresses in the fuse array storage circuitry.

20. The method of claim 17, wherein:
the one or more randomized fuse sense addresses are based on a random fuse sense starting address for reading fuse data in the fuse array storage circuitry; and
the method includes at least one of performing a reading of the first fuse data or performing a reading of the second fuse data by first reading fuse data at the random fuse sense starting address, and by subsequently reading remaining fuse data at fuse sense addresses that sequentially follow an order of fuse sense addresses after the random fuse sense starting address and back up to the random fuse sense starting address until fuse data at all fuse sense addresses in the fuse array storage circuitry has been read.

21. An apparatus of a computing system, the apparatus including:
means for performing, in response to a boot-up signal to boot up the computing system, a first reading of first fuse data stored in a fuse array storage circuitry of a computing system to result in read first fuse data, and receiving the read first fuse data from the fuse array storage circuitry;
means for performing, in response to the boot-up signal to boot up the computing system, and after a random time-delay has elapsed from performing the first reading, a second reading of second fuse data stored in the fuse array storage circuitry to result in read second fuse data, and receiving the read second fuse data from the fuse array storage circuitry; and
means for comparing, in response to a boot-up signal to boot up the computing system, the read first fuse data with the read second fuse data, and in response to a determination that the read first fuse data and the read second fuse data do not match, halting a boot-up of a computing system; and means for using, in response to a boot-up signal to boot up the computing system, one or more randomized fuse sense addresses of the set of fuse sense addresses within the fuse array storage circuitry to at least one of perform the first reading or perform the second reading, each of the one or more randomized fuse sense addresses including a combination of a row address and a column address.

\* \* \* \* \*